INVENTOR
ROBERT R. CHAMBERS
ROBERT L. FOSTER

BY Adams, Forward and McLean
ATTORNEY

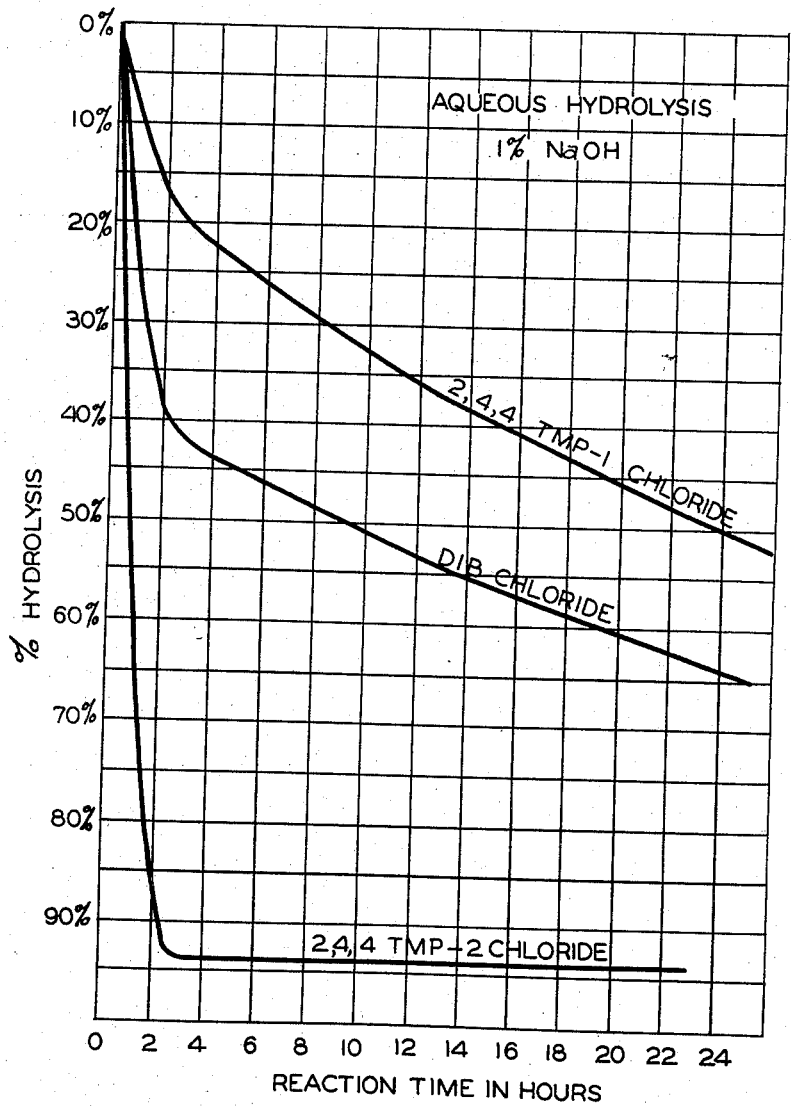

United States Patent Office 2,885,445
Patented May 5, 1959

2,885,445
PROCESS OF HYDROLYZING DIISOBUTYLENE MONOCHLORIDES

Robert R. Chambers and Robert L. Foster, Park Forest, Ill., assignors to Sinclair Refining Company, New York, N.Y., a corporation of Maine Application April 7, 1953, Serial No. 347,222

4 Claims. (Cl. 260—640)

This invention relates to the aqueous hydrolysis of mixtures of primary and secondary monochlorides of diisobutylene to produce primary alcohols. This invention relates further to the aqueous hydrolysis of secondary monochlorinated diisobutylene to form primary alcohols.

Diisobutylene is composed principally of two isomers which can be readily monochlorinated to produce a mixture of three unsaturated monochlorinated isomers as described in application Serial No. 340,152, filed March 3, 1953, now Patent No. 2,783,285. Commonly, diisobutylene is described as containing about 75% to 85% of 2,4,4-trimethylpentene-1 (2,4,4-TMP-1) and about 15% to 25% of 2,4,4-trimethylpentene-2 (2,4,4-TMP-2); however, the amount of each isomer may vary until the diisobutylene is substantially pure 2,4,4-TMP-1 or 2,4,4-TMP-2. One specific diisobutylene contains about 80% of 2,4,4-TMP-1 and about 20% of 2,4,4-TMP-2. The chlorides of the mixture resulting from the chlorination of diisobutylene are allylic in structure and two of the three isomers are primary chlorinated products while the remaining isomer is a secondary chlorinated compound. These chlorinated products have the following structures:

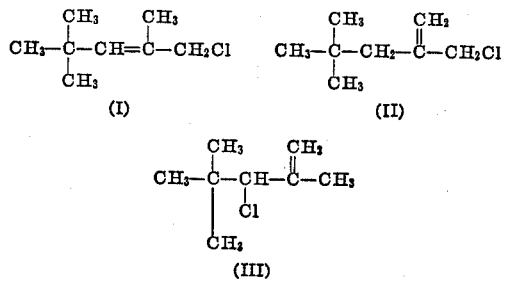

The present invention is concerned with the hydrolysis of a mixture containing substantial amounts of the primary and secondary monochlorides of diisobutylene to form octylene primary alcohols by reaction of the monochlorides with an aqueous medium in the presence of a base; and with the similar hydrolysis of a secondary monochlorinated diisobutylene to yield these alcohols. The products formed have a much more pleasant odor than other $C_8$ alcohols commercially available at the present time, and may be utilized as solvents and as intermediates in the preparation of related chemical products.

Initially, we expected to produce a mixture of primary and secondary alcohols upon aqueous hydrolysis of the primary and secondary monochlorides of diisobutylene, and we believed the alcohols would be in the approximate proportion of the respective chlorides. It is known that at least in some reactions allylic compounds undergo a rearrangement, but this usually leads to formation of products other than the primary derivative. Quite unexpectedly, we found that isomerization was occurring in our aqueous hydrolysis reaction to give substantially entirely the primary alcohol. This reaction is unusual in that the isomerization is so complete that no secondary alcohol can be detected in the product, and, in addition, this substantially complete formation of the primary alcohol is apparently peculiar to the aqueous reaction medium containing a suitable base. Our work has indicated that moderate amounts of inorganic salts and extraneous organic compounds in the aqueous hydrolysis medium do not adversely affect the formation of the desired primary alcohol, but excessive amounts of such contaminants might cause formation of some secondary alcohol. Commercially, primary alcohols are much more valuable than secondary alcohols in the preparation of certain derivatives, e.g. they lead to the formation of esters that are more stable than those derived from secondary alcohols.

It is shown in the application mentioned above that the monochloride formed from 2,4,4-TMP-2 is a secondary chloride, and it has now been found that this chloride hydrolyzes in a basic aqueous medium to form a primary alcohol. Hydrolysis of the monochloride from 2,4,4-TMP-1, which is largely a primary chloride, also gives a primary alcohol product as does the hydrolysis of mixed primary and secondary monochlorides. In each of these aqueous hydrolyses infrared analysis of the product failed to indicate the presence of any secondary alcohol. In Table I below the results of these hydrolyses are summarized and it can be seen that both the primary and secondary chlorides contribute to the formation of the primary alcohol.

TABLE I

| Run | Chloride | Percent Secondary Chloride | Yield of Primary Alcohol, Percent |
|---|---|---|---|
| 1 | 2,4,4-TMP-2 | 90 | 80 |
| 2 | 2,4,4-TMP-1 | 15 | [1] 41 |
| 3 | Mixed | 35 | 79 |

[1] The low yield in run 2 was due to the low percent hydrolysis at which the reaction was stopped.

Although the product of hydrolysis of either the primary or secondary chloride is a primary alcohol, the primary alcohol product contains two isomers. The structures of these two isomers are shown by Formulas IV and V which follow, and the ratio of one isomer to the other is changed as the ratio of the chloride isomers hydrolyzed is varied.

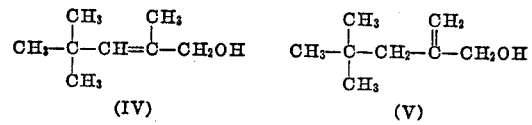

The following table indicates the change in composition of the alcohol as shown by infrared analysis as the composition of the feed stock is varied.

TABLE II

Primary alcohol composition

| Run | Feed Stock | Percent Secondary Chloride | Percent Hydrolysis | Product |
|---|---|---|---|---|
| 2 | 2,4,4-TMP-1-chloride | 15 | 52 | increasing percent of isomer of formula (IV) above. |
| 4 | mixed chlorides | 35 | 84 | |
| 5 | ...do... | 35 | 43 | |
| 1 | 2,4,4-TMP-2-chloride | 90 | 94 | |

The percent hydrolysis in Table II was determined by the length and condition of the reaction, and the greater proportion of isomer (IV) in run 5 is due to the greater proportion of secondary chloride in the total feed hydrolyzed. The secondary chloride from which Formula IV is derived hydrolyzes nearly completely and accounts for over 80% of the alcohol in run 5 but only a little over 40% in run 4. The percent of isomer of Formula V increases in the opposite direction from the increase of Formula IV shown in the table, and the sum of (IV) and (V) is 100%. The data of this table indicate that the alcohol having the internal double bond is formed from the secondary chloride while the alcohol with the external double bond is derived from the primary chloride.

Infrared analysis indicated that the product of the hydrolysis of the usual mixture of chlorides from diisobutylene was a mixture of primary alcohols, and that the predominant alcohol in the mixture has an external double bond (Formula V above). The boiling point of 175–177° C. and refractive index of 1.4459 at 20° C. for the mixture differ markedly from the boiling point 170°–174° C., $n_D^{20}$ 1.4292, for the alcohol of Formula V reported by Byers and Hickinbottom, J. Chem. Soc., p. 1328, 1948. The alcohol from hydrolysis of 2,4,4-TMP-1 chloride was shown by its infrared spectrum to be almost entirely that of Formula V, and it had a refractive index of 1.4452 at 20° C. The other alcohol, Formula IV above, was obtained from 2,4,4-TMP-2 chloride in fair purity as indicated by its infrared spectrum. Its refractive index, $n_D^{20}$ 1.4476, agreed roughly with the $n_D^{20}$ 1.4459 reported by Hickinbottom, J. Chem. Soc., p. 1331, 1948.

The equations for the hydrolysis reactions are as follows:

(1) 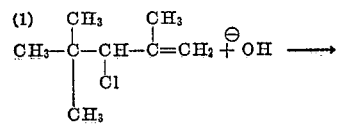

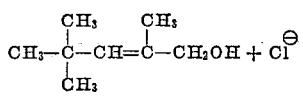

(2) 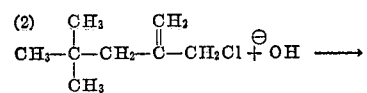

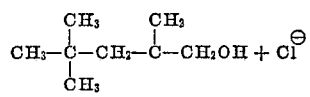

There is some evidence that the monochlorinated diisobutylene isomer (I) is present in the reacting mixture since infrared analysis of the mixed chlorides shows an internal double bond. However, the predominant chlorides are those of Formulas II and III which hydrolyze to the alcohols of Formulas V and IV, respectively. Since the amounts of chlorides (II) and (III) in the hydrolysis feed may correspond roughly to the amounts of 2,4,4-TMP-1 and 2,4,4-TMP-2 in the diisobutylene chlorinated, the amounts of alcohols (V) and (IV) in the final product may be about the same as the percentages of 2,4,4-TMP-1 and 2,4,4-TMP-2, respectively, in the diisobutylene chlorinated.

Aqueous reactions of $C_8$ compounds usually show a low reactivity since these compounds are much less soluble in water than compounds having three or four carbon atoms. This decreased activity apparently holds true even in the case of allylic type compounds of the present invention. For instance, it is known that allyl chloride and methallyl chloride will hydrolyze fairly readily under certain conditions. In our efforts to hydrolyze the allylic monochlorides of diisobutylene in an aqueous medium, we were at first quite unsuccessful in obtaining commercially feasible yields of alcohol even after several days of reaction time. The addition to the reaction of conventional or traditional hydrolysis aids such as bases, emulsifying agents, and catalysts of the sodium oleate type were of no avail in successfully effecting a practical hydrolysis reaction.

Through continued investigation we have established preferred reaction conditions which provide for fairly rapid and substantially complete hydrolysis of the monochlorides of diisobutylene to make the reaction commercially feasible even in the absence of added catalysts. These conditions will be described in more detail in the description following, and it suffices at present to say that we prefer to conduct our aqueous hydrolysis reaction in an excess of base at elevated temperatures and pressures in the presence of fairly large amounts of water and with vigorous stirring of the reacting mixture.

In describing further the present invention reference will be made to the drawings wherein:

Figure 2 is a graph of the rate of hydrolysis of monochlorinated diisobutylene and its separate isomers in a 1% aqueous caustic solution.

Figure 1:
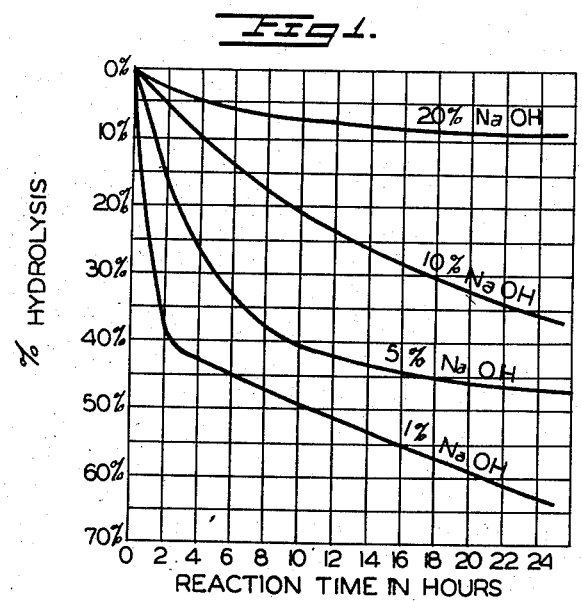
Figure 1 is a graph of the rate of hydrolysis of monochlorinated diisobutylene in various basic aqueous caustic solutions at reflux.

The graphs of Figures 1 and 2 illustrate the effect of the structure of the chloride upon the rate of hydrolysis in an aqueous medium. In these graphs the percent of hydrolysis is plotted against time of the reaction. In Figure 1 a sharp break in the hydrolysis curve was observed when 1% aqueous caustic was utilized as the hydrolyzing medium. This break is not as sharp when 5% caustic is used; however, it occurs at about the same point. Hydrolysis with 10% caustic proceeded so slowly that the break did not occur during the period of the experiment. From the 1% hydrolysis curve it is obvious that two different hydrolysis rates are involved. One rate is relatively rapid, reacting essentially to completeness in about two hours, while the other rate is slower and requires several days to approach complete hydrolysis. In an aqueous medium the rapid hydrolysis rate is due to the presence of the secondary chloride, while the slower hydrolysis rate is assigned to the primary chlorides. This assignment of rates has been substantiated with hydrolysis of pure secondary chloride from 2,4,4-TMP-2, which hydrolysis was over 90% complete in 2½ hours. The mixture of chlorides from 2,4,4-TMP-1 which was expected to be largely primary chloride gave a hydrolysis curve indicating the presence of only about 20% of the secondary chloride. This result fits in with results of the hydrolysis with 1% NaOH of the mixed chlorides from diisobutylene as shown in the graph of Figure 2 in which percent hydrolysis is plotted against time.

During the hydrolysis of monochlorinated diisobutylene some undesirable by-product compounds are usually formed. This may be due to poor stirring which permits localized spots to become acid especially when the concentration of base is low. The amount of these by-products formed may be effectively reduced by using about 10% to 30% of an excess of base. When no base or insufficient base is used, the amount of the by-products is quite high. Two runs with different amounts of base are compared in the table below.

TABLE III

*Effect of excess base*

| Run | Mole Ratio, NaOH/chloride | Final Conc., NaOH | Wt. Percent Undesirable By-Products |
|---|---|---|---|
| 22 | 1.047 | 0.166 N | 6.6 |
| 23 | 1.275 | 0.332 N | 1.6 |

In studying the effects upon the rate of the hydrolysis of the concentration of the base in the hydrolyzing medium, the diisobutylene chloride was hydrolyzed at different concentrations of base while maintaining equimolar quantities of chloride and base. The results of these runs are illustrated in Table IV which follows.

TABLE IV

| Run | Percent NaOH | Percent Hydrolysis in One Hour |
| --- | --- | --- |
| 15 | 1 | 27 |
| 16 | 5 | 9 |
| 17 | 10 | 3 |
| 18 | 20 | 1 |

The results illustrated in Table IV may be explained by an examination of the two-phase system involved. The concentration of chloride in the heterogeneous system is not meaningful, since the true concentration is fixed by the solubility of the chloride in water. However, the amount of water in relation to the chloride is an important factor. If the effect of the water to chloride ratio is cancelled out by dividing the rate of hydrolysis by the water to chloride ratio, it is clear that concentration of the base has little effect upon the rate of hydrolysis. This is illustrated by the following table.

TABLE V

| Run | Percent Hydrolysis in One Hour (corrected to 1 mole chloride/liter H₂O) | Percent NaOH |
| --- | --- | --- |
| 17 | 7.2 | 10 |
| 16 | 10.2 | 5 |
| 15 | 7.0 | 1 |
| 19 | 6.0 | 10 |
| 20 | 7.0 | 5 |

In the present invention we have found that the hydrolysis of the monochlorides of diisobutylene in a basic aqueous medium should be effected while maintaining the reacting mixture at temperatures from about 75° C. to just below the carbonization point of the reacting mixture, e.g. about 200° C. Also, we have found that the rate of hydrolysis increases to a marked degree when the temperature maintained is above the normal boiling point of water, i.e. 100° C. In such cases, however, a pressure should be maintained which is sufficient to insure that substantially all of the water present is in the liquid phase. For instance, the utilization of a reaction temperature of 150° C. and a pressure of about 100 p.s.i.g. has resulted in a very rapid and advantageous rate of hydrolysis as will be described below.

Table VI illustrates the effect of elevated temperatures as high as the reflux temperature at atmospheric pressure upon the rate of the aqueous hydrolysis of diisobutylene chlorides. Although the boiling point of the monochlorides of diisobutylene is in the range of 151° to 158° C., the mixture of chloride and water refluxes at about 94° C. The reflux temperature rises during the hydrolysis to about 98° C., thus making the average reflux temperature about 96° C.

TABLE VI

*Effect of temperature on hydrolysis rate (1% aqueous NaOH)*

| Run | Temperature | Percent Hydrolysis in Five Hours |
| --- | --- | --- |
| 6 | 50° C | 5 |
| 7 | 75° C | 21 |
| 8 | 96° C. (reflux) | 39 |

As previously indicated the hydrolysis rate of the secondary chloride in an aqueous medium is more rapid than that of the primary chloride, and we have found that at increased temperatures the hydrolysis rate of the secondary chloride is increased. Since the primary chloride usually predominates in the mixture of monochlorides of diisobutylene and hydrolyzes slower than the secondary chloride, the hydrolysis rate of the primary chloride must increase appreciably with increased reaction temperatures before the overall hydrolysis will be commercially feasible. In the present invention this increase in the hydrolysis rate of the primary chloride was observed at increased reaction temperature, and the increased temperatures do not give rise to the formation of undesirable by-products.

When our hydrolysis in an aqueous medium is effected at 150° C. in an autoclave which permits the pressure to reach about 100 p.s.i.g. and keeps the water in the liquid phase, the rate of reaction is markedly increased when compared with the hydrolysis rate at reflux temperature. For instance, in a reaction where the temperature was 150° C. and the pressure about 100 p.s.i.g., the hydrolysis was 84% complete in five hours, while in another reaction which was made at reflux temperature and which utilized the same volume of water as the first reaction, the hydrolysis was only 43% complete in 24 hours. Even when four times the volume of water used in the first run was used in a reaction at reflux temperature it was 47 hours before the monochlorinated diisobutylene feed was 75% hydrolyzed. This increase in the hydrolysis rate at temperatures above the normal boiling point of water represents principally an increase in the hydrolysis rate of the primary chloride since the secondary chloride is substantially completely hydrolyzed at reflux temperature, i.e. 96° C. Further increases in the hydrolysis rate to about 90% in one hour were obtained when the temperature was raised to 200° C. and the pressure was increased to maintain the water in the liquid phase.

Performance of the hydrolysis of the monochlorides of diisobutylene at temperatures above 100° C. and pressures sufficient to maintain the water in the liquid phase offers a number of advantages from a commercial standpoint. Under these conditions the time required for hydrolysis is greatly reduced, and it becomes possible to obtain essentially complete hydrolysis which reduces the problem of separation of the alcohol product from unreacted chlorides. The efficiency of the alcohol-chloride separation increases as the percent of chloride decreases. Therefore, it is important that the hydrolysis be carried to very near completion to obtain good once through yields of alcohol. Complete hydrolysis at reflux temperatures requires an unreasonable length of time, making the process uneconomical. Another advantage in using the high temperatures and elevated pressures is that a smaller volume of water may be present in the reacting mixture. This smaller volume is of importance in decreasing the size of equipment necessary or in increasing the capacity of any given equipment. Also, the increased temperature unexpectedly does not increase the amount of side reaction, e.g. dehydrochlorination, present in the hydrolysis.

Stirring or agitation of our reacting mixture is necessary to obtain the best results, particularly when using temperatures above 100° C. The agitation also assures equilibrium between the phases and rapid hydrolysis. For instance, in a reaction which was made at 150° C. without stirring, the feed was only 10% hydrolyzed in six hours. Vigorous stirring also prevents charring due to overheating at the sides of the reaction vessel.

Figure 3:
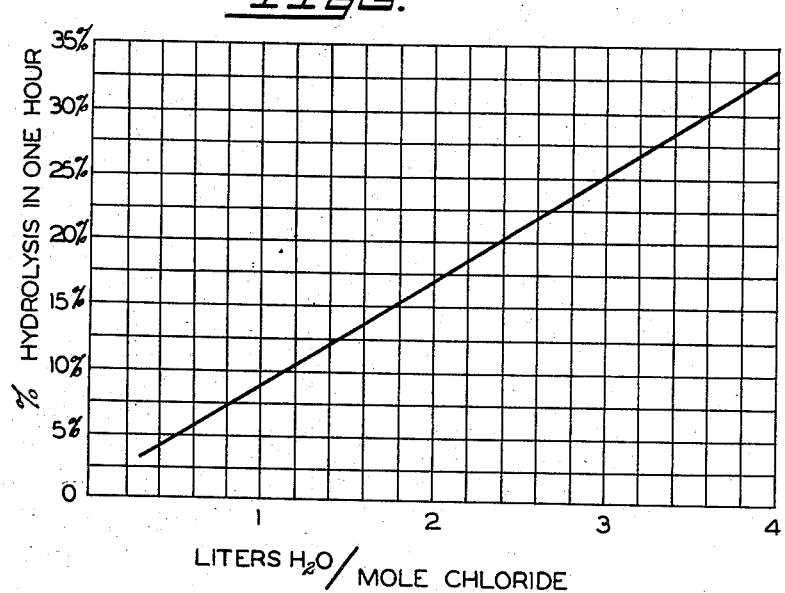
Figure 3 is a graph of the percent hydrolysis in one hour against the ratio of water to chloride in the aqueous reaction mixture.

The water to chloride ratio of our hydrolysis system may affect the hydrolysis rate materially. Changing the concentration of the sodium hydroxide in our reaction results in changing the volume of water used if the ratio of chloride to base is to remain the same. The rate of hydrolysis increases as the ratio of water to chloride increases. This relationship is shown by the graph of Figure 3, wherein water to chloride ratio is plotted against the percent of hydrolysis. The relationship between hydrolysis rate and the water to chloride ratio may be said to be independent of the concentration of the base in the reaction.

In the following table the effect of the water to chloride ratio on the hydrolysis rate is observed and it is shown that by doubling the volume of water the rate of reaction is increased to a marked degree.

TABLE VII

*Effect of water to chloride ratio*

| Run | Percent NaOH | Liters water/ mole Chloride | Percent Hydrolysis in One Hour |
| --- | --- | --- | --- |
| 16 | 5 | .840 | 4 |
| 20 | 5 | 1.70 | 12 |
| 17 | 10 | .430 | 3 |
| 19 | 10 | .840 | 5 |

The ratio of water to chloride in the hydrolysis reaction is not limiting as far as the actual chemical reaction of hydrolysis of the chloride to alcohol is concerned. However, commercially the ratio would be fixed by consideration of the time required for hydrolysis as against size of equipment and temperature requirements. Thus it would probably be impractical to use a high enough water to chloride ratio to obtain complete hydrolysis within a reasonable time at reflux temperature. Also, substantial decreases in the ratio of water to chloride at 150° C. would increase the time requirements. The hydrolysis rate could be increased by increasing the temperature but at the same time the pressure requirements of the equipment are increased. There is also a little greater possibility of by-product formation at the higher temperatures especially when the ratio of water to chloride is low.

The data of the table which follows indicates the effect of water to chloride ratio at high reaction temperatures and show that decreased proportions of water may be effectively used at the higher reaction temperatures.

TABLE VIII

*Effect of water to chloride ratio at high reaction temperatures*

| Run | Temp. | Liters of water/mole chloride | Percent Hydrolysis | Hours |
| --- | --- | --- | --- | --- |
| 5 | reflux | .850 | 43 | 24 |
| 15 | reflux | 3.93 | 64 | 24 |
| 23 | 150° C | .890 | 93 | 4.5 |

The separation of our alcohol product from residual chloride may be accomplished by distillation. A clean separation of the chloride, which has a lower boiling point than the alcohol, was not obtained and even the first fraction of chloride contained considerable amounts of the alcohol. Two types of distillation have been used, i.e. ordinary fractionation and steam distillation; however, steam distillation was used more often.

The specific procedures utilized in collecting the various data mentioned above are exemplified by Examples I and II.

EXAMPLE I.—HYDROLYSIS UNDER REFLUX TEMPERATURE

To 430 ml. of 5% sodium hydroxide solution which was heated to about 100° C. in a three-necked flask fitted with a stirrer and reflux condenser, was added in one portion 75 g. of 2,4,4-TMP-1 chloride preheated to about 100° C. Stirring was started and the temperature was maintained at the reflux temperature of the mixture. At intervals the stirring was stopped, the layers allowed to separate and a 10 ml. sample was taken from the aqueous layer. Stirring was resumed and the sample titrated with .5 N HCl using phenol phthalein as an indicator. Ten ml. of base was then made up to concentration indicated by the titration and added to the reaction. The volume of solution was thus kept constant and no correction factor for the samples was necessary. The hydrolysis was continued for 78 hours at the end of which time titration indicated 52% hydrolysis. The product was steam distilled from the reaction mixture; the material boiling 97°–98.5° C. was over 90% pure. This description illustrates the procedure used in all the runs made under reflux and lower temperatures.

EXAMPLE II.—HYDROLYSIS UNDER HIGH TEMPERATURE 75 g. of chlorinated diisobutylene and 550 ml. of 5% sodium hydroxide were placed in a 1 liter stainless steel high pressure vessel with a plunger type stirrer. The bomb was heated to 150° C. and then stirring was started. Stirring was stopped at intervals and samples were removed from the lower layer. Titration of the samples indicated the progress of the hydrolysis. A correction was made for the samples withdrawn since the samples were not replaced. After six hours 88% of the feed was hydrolyzed.

The alcohol product from our hydrolysis reaction was hydrogenated over platinum at low pressure and at room temperature to 2,4,4-trimethylpentanol-1 according to the following specific procedure.

A solution of 38.5 g. (0.3 mole) of the unsaturated primary alcohol in 200 ml. of ethyl acetate was hydrogenated in a low pressure Parr hydrogenator at room temperature using 0.2 g. $PtO_2$ as catalyst. The hydrogenation was started at 45 p.s.i.g. hydrogen and the pressure drop indicated the addition of 0.3 mole of hydrogen. The product was filtered and distilled; the pure alcohol boiled at 170°–171° C., $n_D^{25}$ 1.4259–1.4263. The 3,5-dinitrobenzoate of the product was prepared and recrystallized twice from a methanol-water mixture. This benzoate had an uncorrected melting point of 72° to 72.5° C.

The infrared spectre together with the derivatives prepared according to the above procedures are further evidence that the product of our aqueous hydrolysis is a mixture of the two isomeric primary alcohols of Formulas IV and V above.

We claim:

1. Process of hydrolyzing a mixture comprising substantial amounts of primary and secondary unsaturated monochlorides of diisobutylene to yield diisobutylene primary alcohol substantially to the exclusion of diisobutylene secondary alcohol which comprises reacting the mixture of diisobutylene chlorides with a basic aqueous hydrolyzing medium, in which the base is present in an excess of about 10 to 30% and in which sufficient water is present to provide a water to chloride ratio contributive to a high rate of hydrolysis, at a temperature from about 100° C. to the carbonization temperature of the reacting mixture and at a pressure sufficient to maintain the water in the liquid phase while agitating the reacting mixture.

2. Process of hydrolyzing secondary monochloride of diisobutylene to yield the corresponding primary alcohol substantially to the exclusion of diisobutylene secondary alcohol which comprises reacting the diisobutylene secondary monochloride with a basic aqueous hydrolyzing medium in which the base is present in an excess of about 10 to 30% and in which sufficient water is present to provide a water to chloride ratio contributive to a high rate of hydrolysis, at a temperature from about 100° C. to the carbonization temperature of the reacting mixture and at a pressure sufficient to maintain the water in the liquid phase while agitating the reaction mixture.

3. Process of claim 1 in which the temperature is about 150° C. and the water to chloride ratio is about 0.43 to about 1.7.

4. Process of claim 2 in which the temperature is about 150° C. and the water to chloride ratio is about 0.43 to about 1.7.

References Cited in the file of this patent

UNITED STATES PATENTS 2,072,015  Tamele et al. _____ Feb. 23, 1937

OTHER REFERENCES

Umnova: Jour. Russ. Phys. Chem. Soc., vol. 42, 1911, pp. 1530, 1532 and 1536 to 1539.

Chemical Abstracts, A. Umnova, vol. 5 (1911), page 3572.

Beilstein: Handbuch der Organischen Chemie, 4th ed., vol. I, 1st supplement, 1928, page 230.

Byers et al.: Journal of the Chemical Society, London, 1948, part II, pages 1328 to 1330.